June 19, 1951

H. C. ANDERSON ET AL 2,557,586

VALVE

Filed June 17, 1948

Henry C. Anderson
Ervin L. Sommerfeldt
INVENTORS

BY *Clarence A. O'Brien*
and *Harvey B. Jacobson*
Attorneys

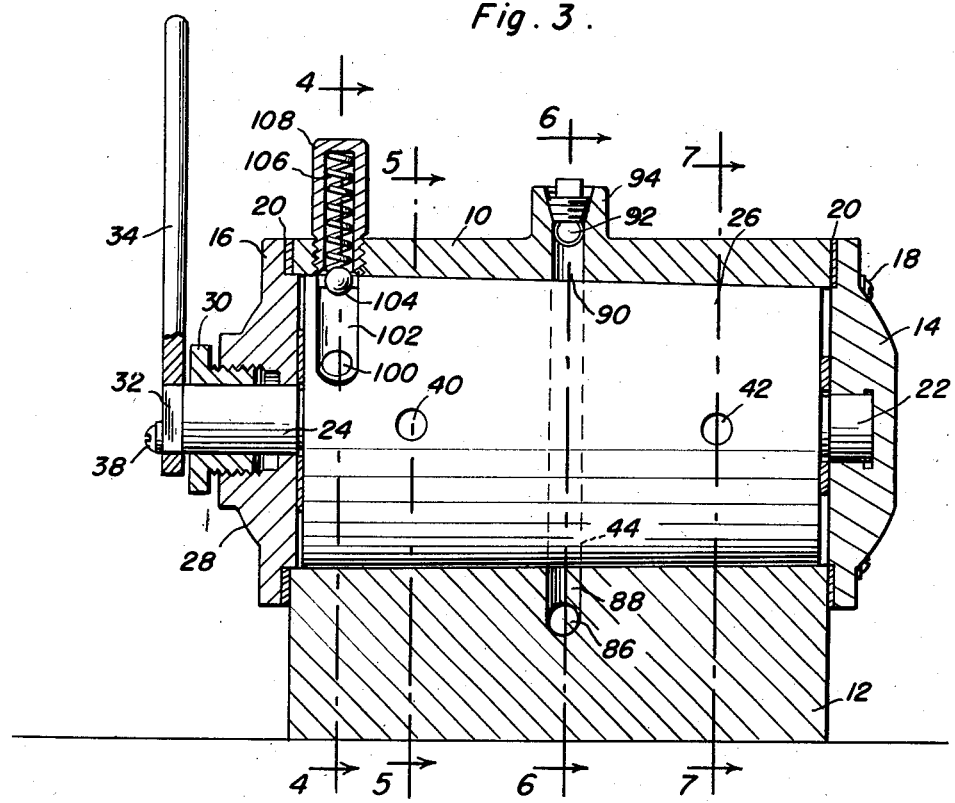

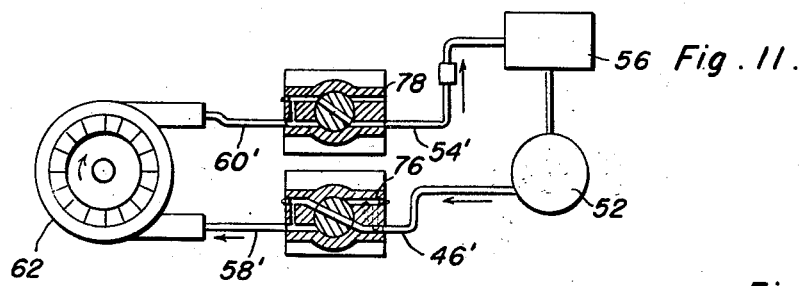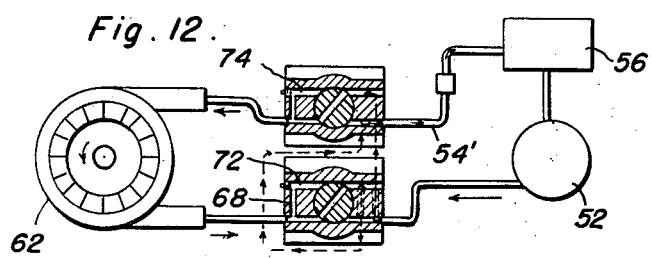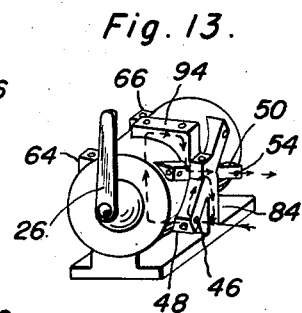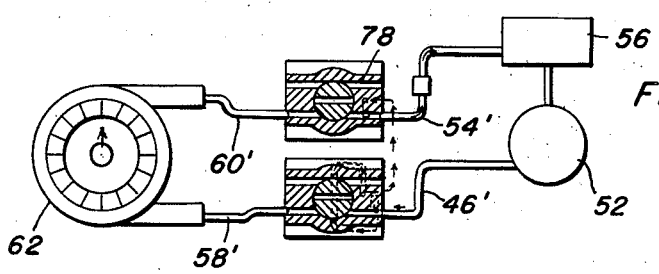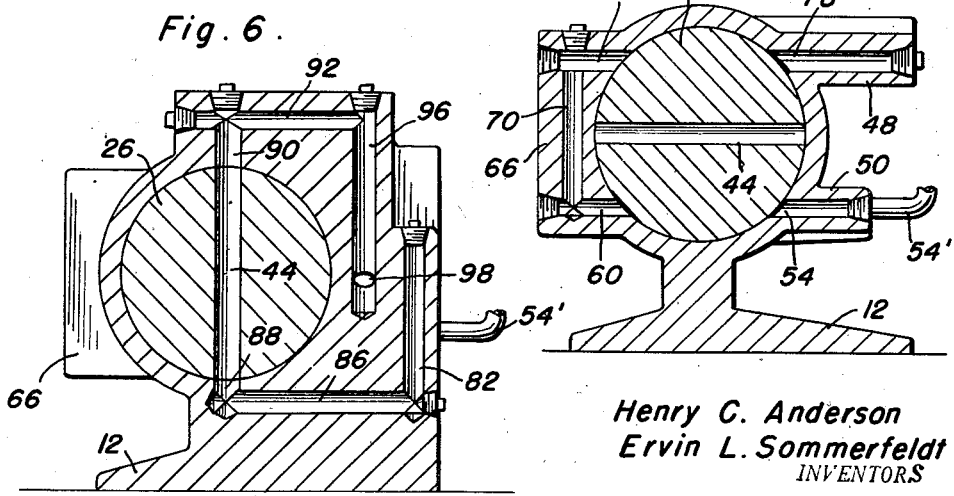
Henry C. Anderson
Ervin L. Sommerfeldt
INVENTORS June 19, 1951
H. C. ANDERSON ET AL
2,557,586
VALVE
Filed June 17, 1948
4 Sheets-Sheet 4
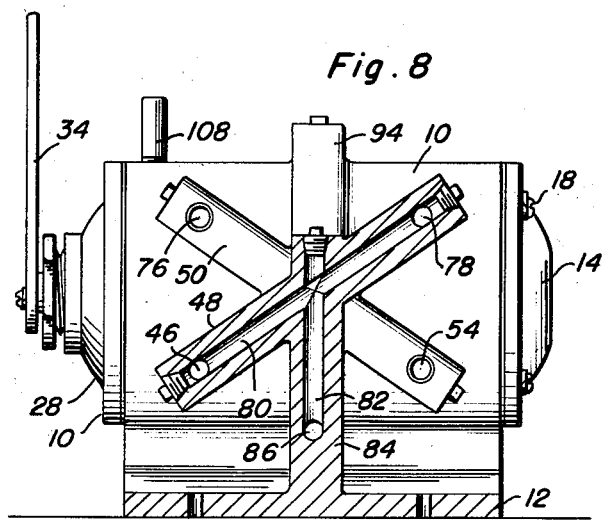
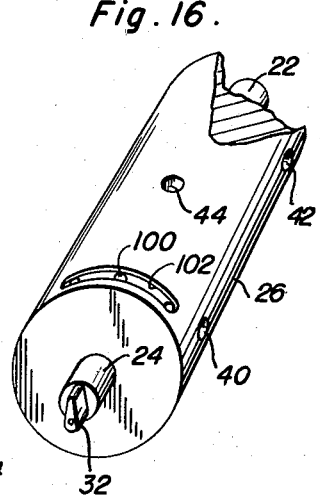
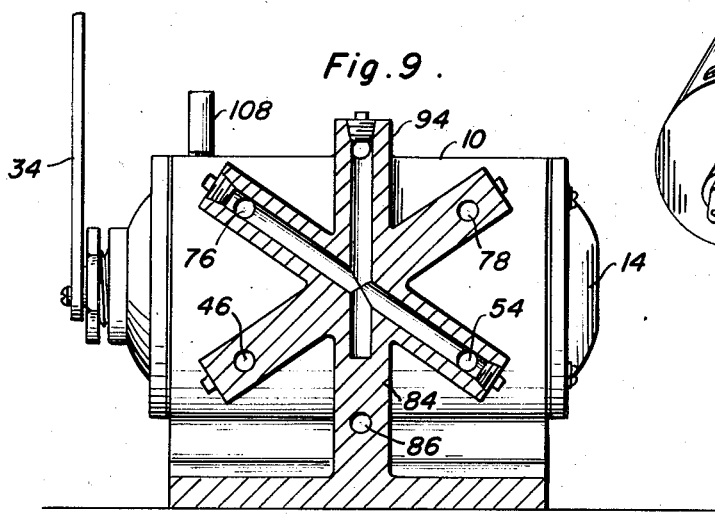
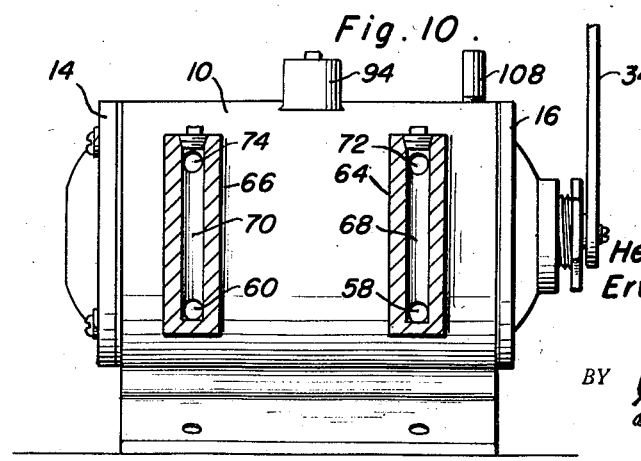
Henry C. Anderson
Ervin L. Sommerfeldt
INVENTORS
BY Clarence A. O'Brien
and Harvey B. Jacobson
Attorneys Patented June 19, 1951

2,557,586

UNITED STATES PATENT OFFICE 2,557,586

VALVE

Henry C. Anderson and Ervin L. Sommerfeldt, Arpin, Wis.

Application June 17, 1948, Serial No. 33,526

4 Claims. (Cl. 251—105)

This invention relates generally to valves and more particularly to a valve having a generally cylindrical casing and a rotary plug.

A primary object of this invention is to provide a valve which is especially well suited for incorporation with hydraulic systems such as are used for hydraulic transmission in motor vehicles, boats and power lifts, the valve being designed to provide for forward and reverse drive and for being positioned in a neutral position so that a driving unit or pump may continue to function while the driven unit is allowed to idle.

Another object of this invention is to provide a valve in which the casing and plug are each easily constructed according to conventional manufacturing processes at a reasonable cost.

And a last object to be mentioned specifically is to provide a valve which is simple and convenient to operate and which will give generally efficient and durable service.

With these objects definitely in view, this invention resides in certain novel features of construction, combination and arrangement of elements and portions which will be hereinafter described in the specification, particularly pointed out in the appended claims, and illustrated in the accompanying drawings which form a material part of this application, and in which:

Figure 3 is a central longitudinal vertical sectional view of the assembled valve;

Figures 4, 5, 6 and 7 are transverse vertical views, taken on the corresponding section lines in Figure 3;

Figure 8 is a vertical sectional view, taken through the outer of a pair of crossed channelled members on one side of the casing;

Figure 9 is a similar view taken through the inner of the said crossed channelled members;

Figure 10 is a somewhat similar view taken through the vertical channelled members on the opposite side of the casing;

Figures 11 and 12 are diagrammatic views designed to illustrate the positioning of the plug for forward drive and reverse drive, respectively;

Figures 13 and 14 are diagrammatic views to illustrate the positioning of the plug in neutral position and the course of the hydraulic fluid when the plug is in this neutral position;

Figure 16 is a three dimensional view of the valve plug, a portion being broken away to show the journal at one end of this plug.

Similar characters of reference designate similar or identical elements and portions throughout the specification and throughout the several views in the drawings.

Figure 1:
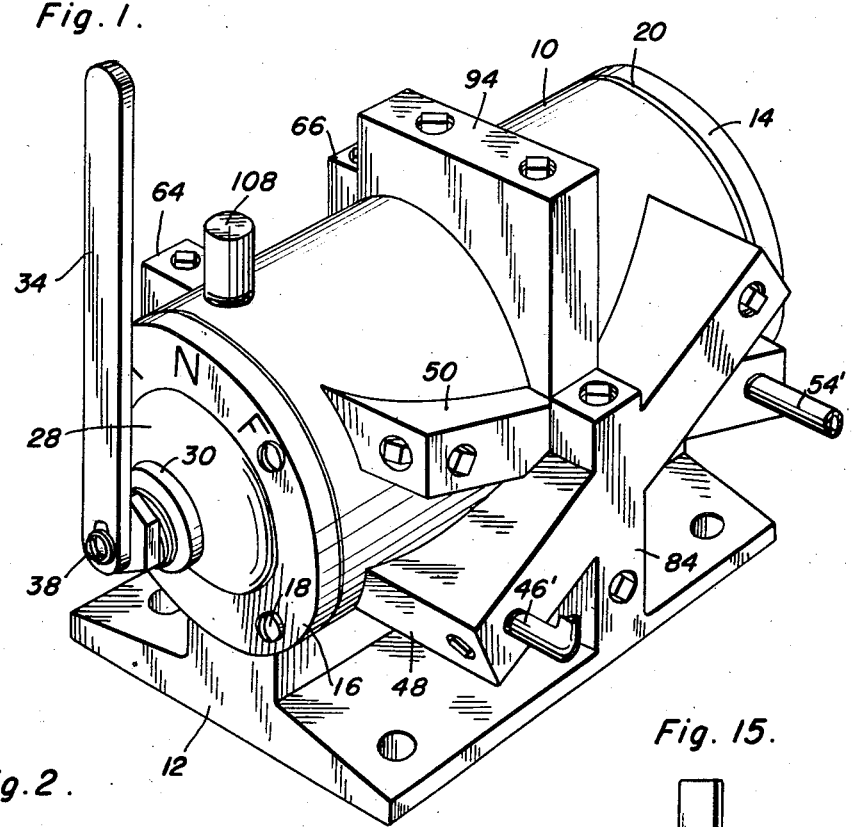
Figure 1 is a perspective view of the assembled valve.
Figure 2:
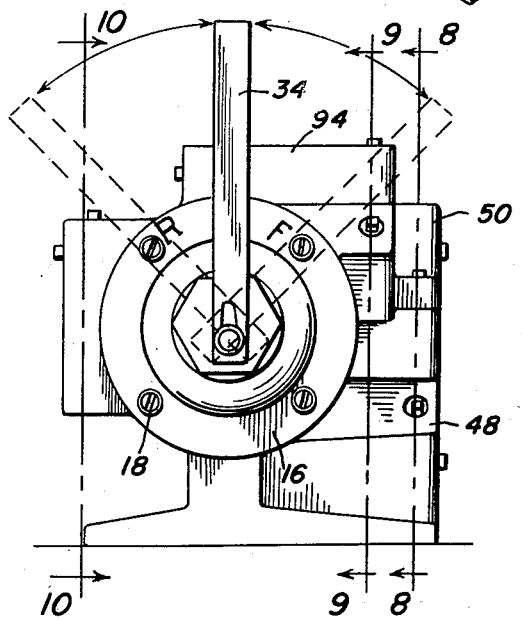
Figure 2 is a front end view of the assembled valve with the handle which is used to control the positioning of the plunger shown in reverse and forward drive positions in dash line.
Figure 15:
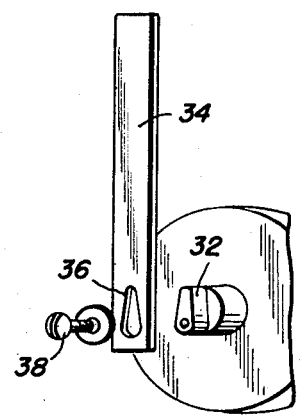
Figure 15 is a three dimensional view showing how the handle is connected to one end of the valve plug.

Referring now to the drawings in detail, this invention is adapted to be used with an environment including a hydraulic transmission such as is used in boats, motor vehicles and in hydraulically operated elevators, and the valve includes a generally cylindrical casing 10 supported on a flanged base 12 and having end caps 14 and 16. These caps are mounted on the casing by means of screws 18 and a gasket 20 may be inserted between the caps and the ends of the casing.

The caps are formed with simple bearings to receive journals 22 and 24 on the ends of the valve plug 26 which is a solid cylinder of an external diameter substantially equal to the internal diameter of the casing 10. The cap 16 is formed with a belled portion 28 which is fitted with a bushing 30 and the journal 24 is formed with a boss 32 which receives the one end of a handle 34 having a slot 36 of a configuration conforming with the boss 32, a screw 38 being provided to hold the handle 34 on the boss 32.

The plug 26 is provided with diametrically disposed bores which will be referred to as the front bore 40, the rear bore 42 and the intermediate bore 44, these bores being spaced longitudinally of the plug the front and rear bores being parallel and the ends of the intermediate bore 44 being spaced circumferentially from the ends of the first and rear bores. The casing has a pressure inlet 46 which for easy reference may be considered as including a bore extending horizontally through the lower end of the outer channelled member 48 which is one of a pair of crossed channelled members integral and disposed on one side of the casing 10, the other channelled member being indicated at 50. The bore 46 will have associated therewith a pressure inlet tube 46′, and it will be understood that the inlet 46 will open as a port on the inside of the casing 10. The pressure inlet will be connected to a pump 52, indicated diagrammatically in Figures 11, 12 and 14. A return outlet 54, shown associated with a pipe 54′ and a reservoir 56, is provided in the lower portion of the inner of the cross channelled members 50.

On the opposite side of the casing there are provided a pressure outlet 58 and a return inlet 60, opposite to the pressure inlet 46 and the return outlet 54, respectively, and connecting with a pressure outlet pipe 58' and a return inlet pipe 60', which pipes are operatively associated with a driven hydraulic unit 62.

Vertically disposed channelled members 64 and 66 on the said opposite side of the casing have channels 68 and 70 connecting the pressure outlet 58 and the return inlet 60 with horizontal channels 72 and 74 leading to ports in the same vertical planes as the pressure inlet and return outlet but disposed diametrically oppositely thereto. Another pair of ports 76 and 78 are provided in the inner and outer cross channelled members 48 and 50 near the upper ends thereof and disposed diametrically opposite to the pressure outlet port and the return inlet port.

The foregoing structure provides means for forward drive and reverse drive of the driven element or unit 62, and there will now be described a simple means provided to allow the pump 52 to continue to function while the said driven unit 62 is not being driven. For this neutral position of the valve, fluid from the pump 52 is led from the pressure inlet pipe 46' through a lower portion 80 of a channel in the outer channelled member 48 to the confluence of this channel 80 with a vertical channel 82 in a flange 84 on the casing. The channel 82 communicates with a horizontal channel 86 leading to a port 88 at the center of the casing and adapted to register with one end of the intermediate bore 44 in the plug 26 when this plug is turned into neutral position. A neutral position return port 90 at the top of the casing communicates with a horizontal channel 92 in a flange 94 on the top of the casing and this channel 92 communicates with a vertical channel 96, which in turn communicates with the channel 98 in the inner of the crossed channelled members leading to the return outlet pipe 54'.

Finally, the plug 26 is provided with three recesses or seats 100 within a groove 102 adjacent the front end of the plug 26, and a ball-shaped keeper 104 is spring biased downwardly selectively into these recesses 100 by a spring 106 enclosed within a screw cap 108 on the adjacent portion of the casing 10.

The operation of this invention will be clearly understood from a consideration of the foregoing description together with a consideration of the drawings and the objects recited above. It will be clear that a valve has been provided which will allow for forward drive, reverse drive and neutral positioning thereof to allow activation and non-activation of the driven unit 62. It may be particularly noted that the dash lines and arrows in Figures 11-14 indicate how the channels in the crossed members 48 and 50 facilitate the routing of the fluid so that a very simple valve structure is achieved. Indicia may be placed on the cap 16 in order to indicate the manner in which the handle 34 is to be shifted to achieve forward, reverse and neutral positioning of the plug 26, suitable indicia being indicated in Figure 1.

The by-pass route of the fluid when the plug is in neutral position has already been described. When the plug is turned to forward drive position, the fluid from the pump 52 is forced into the pressure inlet 46, through the front bore 40, downwardly through the vertical channel 68, to the driven unit 62, returning by way of the return inlet 60, vertical channel 70, horizontal channel 74, rear bore 42 in the plug 26, and return outlet 54 and return outlet pipe 54', to the pump 52.

For reverse activation of the driven unit, the fluid from the pump 52 is routed into the port 46, inclined channel 89, horizontal channel 78, rear bore 42 of the plug and port 60 to the unit 62, returning by way of port 58, front bore 40 of the plug, channel 76, through the channel in the inner channeled member 50 to the return outlet 54.

Obviously many minor variations may be made in the exact detail of construction and proportionment of the various elements of this invention without departure from the spirit thereof, and this invention should be limited only as determined by a proper interpretation of the subjoined claims.

Having described the invention, what is claimed as new is:

1. A valve comprising a valve casing having a cylindrical bore, a rotary valve plug operatively mounted in said bore, said plug having front, rear and intermediate transversely disposed bores extending through said plug and spaced longitudinally of the plug the front and rear bores being parallel and the intermediate bore having its ends also spaced circumferentially from the ends of the front and rear bores, said casing having a pressure inlet and a pressure outlet at opposite ends of the front bore when the plug is in a drive position, a return inlet and a return outlet at opposite ends of said rear bore when the plug is in the same position, and a by-pass in said casing connecting said pressure inlet and said return outlet to the ends of said intermediate bore when the plug is turned to a neutral position, said casing having a cylindrical body portion and integral channeled members disposed exteriorly of the body portion, the channels in said channeled members connecting opposite ends of said bores and comprising said by-pass and having said inlet and outlet therein.

2. A valve according to claim 1 and wherein all of said bores are diametrically disposed in said plug.

3. A valve comprising a valve casing having a cylindrical bore, a rotary valve plug operatively mounted in said bore, said plug having front, rear and intermediate transversely disposed bores extending through said plug and spaced longitudinally of the plug the front and rear bores being parallel and the intermediate bore having its ends also spaced circumferentially from the ends of the front and rear bores, said casing having a pressure inlet and a pressure outlet at opposite ends of the front bore when the plug is in a drive position, a return inlet and a return outlet at opposite ends of said rear bore when the plug is in the same position, a by-pass in said casing connecting said pressure inlet and said return outlet to the ends of said intermediate bore when the plug is returned to a neutral position, said casing having crossed channels leading from said pressure inlet and said return outlet and terminating in ports similarly spaced circumferentially from said return outlet and said pressure inlet respectively, and other channels leading from said pressure outlet and said return inlet and terminating in ports similarly circumferentially spaced from said pressure outlet and return inlet, whereby reverse flow may be achieved in a driven unit connected to said pressure outlet and return inlet.

4. A valve comprising a valve casing having a cylindrical bore, a rotary valve plug operatively mounted in said bore, said plug having front, rear and intermediate transversely disposed bores extending through said plug and spaced longitudinally of the plug the front and rear bores being parallel and the intermediate bore having its ends also spaced circumferentially from the ends of the front and rear bores, said casing having a pressure inlet and a pressure outlet at opposite ends of the front bore when the plug is in a drive position, a return inlet and a return outlet at opposite ends of said rear bore when the plug is in the same position, a by-pass in said casing connecting said pressure inlet and said return outlet to the ends of said intermediate bore when the plug is returned to a neutral position, said casing having crossed channels leading from said pressure inlet and said return outlet and terminating in ports similarly spaced circumferentially from said return outlet and said pressure inlet respectively, other channels leading from said pressure outlet and said return inlet and terminating in ports similarly circumferentially spaced from said pressure outlet and return inlet, whereby reverse flow may be achieved in a driven unit connected to said pressure outlet and return inlet, and means to locate the plug in drive and neutral positions comprising a groove in the plug, spaced recesses in the base of the groove, and a spring biased ball keeper selectively engaged in said recesses.

HENRY C. ANDERSON.
ERVIN L. SOMMERFELDT.

REFERENCES CITED

The following references are of record in the file of this patent:

UNITED STATES PATENTS

| Number | Name | Date |
|---|---|---|
| 1,346,086 | Funk | July 6, 1920 |